United States Patent
Kuramitsu et al.

[11] Patent Number: 5,883,699
[45] Date of Patent: Mar. 16, 1999

[54] METHOD AND APPARATUS FOR PREPARING PHOTOGRAPHIC PROCESSING CONTROL TOOL

[75] Inventors: Yasuo Kuramitsu; Eiji Yamada; Tomio Fukuda; Takeo Komazaki, all of Tokyo, Japan

[73] Assignee: Fuji Photo Film, Co., Ltd., Kanagawa, Japan

[21] Appl. No.: 671,960

[22] Filed: Jun. 28, 1996

[30] Foreign Application Priority Data

Jun. 30, 1995 [JP] Japan ................................ 7-166667
Jun. 30, 1995 [JP] Japan ................................ 7-166668

[51] Int. Cl.$^6$ ........................... G03B 27/32; G03B 27/52
[52] U.S. Cl. ............................................. 355/40; 355/77
[58] Field of Search .................. 355/39, 40, 77

[56] References Cited

U.S. PATENT DOCUMENTS

| | | | |
|---|---|---|---|
| 5,223,891 | 6/1993 | Fierstein et al. | 355/77 |
| 5,313,251 | 5/1994 | Fierstein et al. | 355/77 |
| 5,512,396 | 4/1996 | Hicks | 355/40 X |

FOREIGN PATENT DOCUMENTS 5-506733  9/1993  Japan ................. G03C 5/08

*Primary Examiner*—Fred L. Braun
*Attorney, Agent, or Firm*—Sughrue, Mion, Zinn, MacPeak & Seas, PLLC

[57] ABSTRACT

An image of a preselected subject is photographed by a camera and is recorded on a reversal film, and a film image thus recorded is read by a scanner and is stored in a storing medium. Data of a photographic processing control image prepared by computer graphics is stored in the storing medium, and a composite image of the image of the subject and the control image is prepared. The image data of a subject portion of the composite image and the image data of a control image portion of the composite image are independently corrected, then the composite image with the corrected image data is recorded on the reversal film, and then the composite image recorded on the reversal film is printed with a negative film interposed therebetween. These operations are repeated until respective subject images of the print obtained by the composite image and of a print obtained by photographing the subject have substantially the same quality and the density and color balance of the control image portion become proper. By using the composite image recorded on the reversal film when these subject images have substantially the same quality and the density and color balance become proper, a photographic processing control tool is prepared.

12 Claims, 7 Drawing Sheets

METHOD AND APPARATUS FOR PREPARING PHOTOGRAPHIC PROCESSING CONTROL TOOL

BACKGROUND OF THE INVENTION

1. Field of the Invention

The present invention relates to a method for preparing a photographic processing control tool, and particularly to a method for preparing a photographic processing control tool which is suitable for use in setting of an exposure condition and in checking the development properties of an automatic printer or a printer processor having the function of automatically controlling an exposure amount and printing an image of a photographic film, which is a silver salt photographic recording medium, onto a photographic printing paper which is a silver salt photographic recording medium.

2. Description of the Related Art

Generally, in an automatic printer (or a printer processor having a function of development processing) in which an image recorded on a color negative film is printed onto a color photographic printing paper so that a positive image is obtained, the amount of exposure of light for printing is controlled on the basis of the following formula (1):

$$\log Fi = Ki + Di \tag{1}$$

where Fi is an amount of exposure of light for printing, Ki is a constant determined from combination of the automatic printer with a photographic printing paper, Di is the light accumulated transmission density (LATD) of a negative image, and i is any of R(red), G(green) and B(blue) light.

In order to constantly obtain a color print of good quality by using the automatic printer, it is necessary to effect development processing properly and to set an exposure condition of the automatic printer correctly. The automatic printer has a function (i.e., slope control function) of correcting its processing operations so that density and color balance of a finished print become identical with each other irrespective of the density of a negative film (under-exposure, normal-exposure, and over-exposure negatives). In order to adjust the slope control function to set the exposure condition, a so-called Bull's-eye which is a kind of control negative is generally used. The Bull's-eye is prepared in such a manner that a portion corresponding to a negative with a gray-colored subject photographed thereon and a portion corresponding to a negative with a yellowish green-colored subject photographed thereon around the portion corresponding to the negative of the gray-colored subject photographed are exposed.

In the Bull's-eye, a portion corresponding to a circular gray-colored subject is simply formed in a central portion thereof. As a result, there is a problem in that the relationship between that subject and subjects to be printed is not clear.

In order to solve this problem, there is disclosed, in JP-A-5-506733, a method for preparing a control tool of a second-generation camera original using a digitally-prepared transparency photograph which shows an actual scene. In this method, a preselected scene and a first image including a subject are photographed on a first photographic recording medium and a second image indicating photographic processing control information is photographed on a second photographic recording medium. Next, the first image is converted into a first numerical image and the second image is converted into a second numerical image. These numerical images are recorded on a primary digital image data metric in a digital image data base. Subsequently, composite digital image data is prepared by digitally inserting the second numerical image in the first numerical image and at least one parameter of the composite image is selectively adjusted. Further, the composite image is recorded on the photographic recording medium digitally by using a digital output recording medium, the composite image recorded on the photographic recording medium is photographed, the composite image photograph thus obtained is subjected to development processing, and a control tool is thereby obtained.

However, in the above-described prior art method, after the second image representing photographic processing control information has been photographed by a camera, it is photo-numerically converted into a numerical image. Accordingly, two processes for photographing and numeric representation are needed and the time and process involved in preparation of the tool is thereby increased.

Further, since the automatic printer or printer processor has a function of photometrically measuring the negative image to automatically control an amount of exposure, different subjects have different amounts of exposure. Accordingly, the density of photographic processing control information of the prepared print varies in accordance with a change of the subject. However, in the prior art, at least one parameter of the composite image is selectively adjusted and the image of the subject and the photographic processing control information are adjusted at the same time. As a result, when adjustment is made depending on the subject, adjustment of the subject image affects the photographic processing control information on the print, and when adjustment is made depending on the photographic processing control information, adjustment of the photographic processing control information affects the subject image on the print. Accordingly, there exists a problem in that concurrent adjustment of the subject and the photographic processing control information by the parameter leads to much time and process involved in preparation of the tool.

The present invention has been devised to overcome the above-described problems and it is an object of the present invention to provide a method for preparing a photographic processing control tool which allows preparation of a photographic processing control tool by using a simple structure without requiring any time and trouble.

SUMMARY OF THE INVENTION

The first aspect of the present invention is a method for preparing a photographic processing control tool, comprising the steps of: (a) photographing a preselected subject and recording an image of the subject on a first silver salt photographic recording medium; (b) photographing the subject synchronously with or substantially synchronously with the photographing of said step (a) and recording an image of the subject on a second silver salt photographic recording medium; (c) converting the image of the subject recorded on the second silver salt photographic recording medium into digital image data and storing the digital image data in a digital storing medium; (d) storing, in the digital storing medium, data of a photographic processing control image digitized by computer graphics; (e) preparing a composite image of the subject image and the photographic processing control image on the basis of the digital image data stored in said step (c) and the data of the photographic processing control image stored in said step (d); (f) until a subject image portion of a print obtained from the first silver salt photographic recording medium and a subject image portion of a print obtained from the second silver salt photographic recording medium have substantially the same quality and density and color balance of a photographic processing control image portion of a print obtained from the second silver salt photographic recording medium become proper, repeating the operations of: independently correcting image data of a subject image portion of the composite image and image data of a photographic processing control image portion of the composite image, recording the composite image with the image data corrected in an intermediate silver salt photographic recording medium of the same kind as the second silver salt photographic recording medium, and recording, on a third silver salt photographic recording medium of the same kind as the first silver salt photographic recording medium, the composite image recorded on the intermediate silver salt photographic recording medium; and (g) preparing a photographic processing control tool by using the intermediate silver salt photographic recording medium when the subject image portions have substantially the same quality and the density and color balance of the photographic processing control image portion.

In step (a), the preselected subject is photographed and the image of the subject is recorded on the first silver salt photographic recording medium. In step (b), the same subject is photographed synchronously with or substantially synchronously with the photographing of step (a) and the image of the subject is recorded on the second silver salt photographic recording medium. As the subject, a standard subject, for example, a human figure can be selected. Each photographing of steps (a) and (b) is preferably performed at the same time. However, if the photographing operations of steps (a) and (b) have the same photographing condition, it is not always necessary to effect these photographing operations at the same time and these photographing operations may be effected substantially at the same time.

In step (c), the image of the subject recorded on the second silver salt photographic recording medium is converted into digital image data and is stored in the digital storing medium. In step (d), data of the photographic processing control image digitized by computer graphics is stored in the digital storing medium. In order to convert the image of the subject recorded on the second silver salt photographic recording medium into the digital image data, it suffices that the image of the subject recorded on the second silver salt photographic recording medium be read by a scanner.

In step (e), the composite image of the subject image and the photographic processing control image is prepared on the basis of the digital image data stored in step (c) and the data of the photographic processing control image stored in step (d).

In step (f), the composite image is recorded on an intermediate silver salt photographic recording medium which is the same as the second silver salt photographic recording medium and the composite image recorded on the intermediate silver salt photographic recording medium is recorded on the third silver salt photographic recording medium which is the same as the first silver salt photographic recording medium. When the subject image portion of the print obtained from the first silver salt photographic recording medium and the subject image portion of the print obtained from the third silver salt photographic recording medium do not have substantially the same quality, or when the density or color balance of the photographic processing control image portion of the print is not proper, image data of the subject image portion of the composite image and image data of the photographic processing control image portion of the composite image are independently corrected, then the composite image with the corrected image data is recorded on the intermediate silver salt photographic recording medium. Then the composite image recorded on the intermediate silver salt photographic recording medium is recorded on the third silver salt photographic recording medium. These operations are repeated until the subject image portion of the print obtained from the first silver salt photographic recording medium and the subject image portion of the print obtained from the second silver salt photographic recording medium have substantially the same quality and the density and color balance of the photographic processing control image portion of the print obtained from the third silver salt photographic recording medium become proper.

Then, by using the intermediate silver salt photographic recording medium when the subject image portions have substantially the same quality, and the density and when color balance of the photographic processing control image portion become proper, the photographic processing control tool is prepared.

A color negative film or a color reversal film is used for photographing in a general still camera for silver salt photography. Further, in the automatic printer or printer processor, an image is printed onto a color paper by using a color negative film or a color reversal film, on which the image is recorded. Accordingly, color negative films can be used as the first silver salt photographic recording medium and the third silver salt photographic recording medium, and color reversal films can be used as the second silver salt photographic recording medium and the intermediate silver salt photographic recording medium. In this case, the photographic processing control tool can be prepared by photographing the composite image of the intermediate silver salt photographic recording medium and recording the composite image on the color negative film.

The second aspect of the present invention is a method for preparing a photographic processing control tool, comprising the steps of: (a) photographing a preselected subject by a still camera for silver salt photography and recording an image of the subject on a first silver salt photographic recording medium; (b) photographing the subject synchronously with or substantially synchronously with the photographing of step (a) by a digital still camera and storing digital image data of the subject in a digital storing medium; (c) storing, in the digital storing medium, data of a photographic processing control image digitized by computer graphics; (d) preparing a composite image of the subject image and the photographic processing control image on the basis of the digital image data stored in step (b) and the data of the photographic processing control image stored in step (c); (e) until a subject image portion of a print obtained from the first silver salt photographic recording medium and a subject image portion of a print obtained from the second silver salt photographic recording medium have substantially the same quality and density and color balance of a photographic processing control image portion of a print obtained from the second silver salt photographic recording medium become proper, repeating the operations of: independently correcting image data of a subject image portion of the composite image and image data of a photographic processing control image portion of the composite image, recording the composite image with the image data corrected in an intermediate silver salt photographic recording medium which is different kind from the first silver salt photographic recording medium, and recording, on a second silver salt photographic recording medium which the same as the first silver salt photographic recording medium, the composite image recorded on the intermediate silver salt photographic recording medium; and (f) preparing a photographic processing control tool by using the intermediate silver salt photographic recording medium when the subject image portions have substantially the same quality and the density and color balance of the photographic processing control image portion become proper.

The third aspect of the present invention is a method for preparing a photographic processing control tool, comprising the steps of: (a) storing, in a digital storing medium, pictorial digital image data digitized by computer graphics; (b) storing, in the digital storing medium, data of a photographic processing control image digitized by computer graphics; (c) preparing a composite image of a pictorial image and the photographic processing control image on the basis of the digital image data stored in said step (a) and the data of the photographic processing control image stored in said step (b); (d) until a subject image portion of a print obtained from the second silver salt photographic recording medium has proper quality and density and color balance of a photographic processing control image portion of a print obtained from the second silver salt photographic recording medium become proper, repeating the operations of: independently adjusting image data of a subject image portion of the composite image and image data of a photographic processing control image portion of the composite image, recording the composite image with the image data adjusted in an intermediate silver salt photographic recording medium, and recording, on a second silver salt photographic recording medium of a different kind from the intermediate silver salt photographic recording medium, the composite image recorded on the intermediate silver salt photographic recording medium; and (e) preparing a photographic processing control tool by using the intermediate silver salt photographic recording medium when the subject image portion has proper quality and the density and color balance of the photographic processing control image portion become proper.

In accordance with second aspect of the present invention, in the step (a), the preselected subject is photographed by the still camera for silver salt photography and image of the subject is recorded on the first silver salt photographic recording medium. Further, in the step (b), the same subject is photographed by the digital still camera synchronously with or substantially synchronously with the photographing of the step (a) and the digital image data of the subject is stored in the digital storing medium. As the subject, a standard subject, for example, a human figure can be selected. It is preferable that each photographing of steps (a) and (b) be effected at the same time. However, if the photographing operations of steps (a) and (b) have the same photographing condition, it is not always necessary to effect these photographing operations at the same time and the photographic operations may be effected substantially at the same time.

In step (c), the data of the photographic processing control image digitized by computer graphics is stored in the digital storing medium.

In step (d), the composite image of the subject image and the photographic processing control image is prepared on the basis of the digital image data stored in step (b) and the data of the photographic processing control image stored in step (c).

In step (e), the composite image is recorded on the intermediate silver salt photographic recording medium which is different from the first silver salt photographic recording medium and the composite image recorded on the intermediate silver salt photographic recording medium is recorded on the second silver salt photographic recording medium which is the same as the first silver salt photographic recording medium. When the subject image portion of the print obtained from the first silver salt photographic recording medium and the subject image portion of the print obtained from the second silver salt photographic recording medium do not have substantially the same quality, or when the density or color balance of the photographic processing control image portion of the print obtained from the second silver salt photographic recording medium is not proper, image data of the subject image portion of the composite image and image data of the photographic processing control image portion of the composite image are independently corrected, then the composite image with the corrected image data is recorded on the intermediate silver salt photographic recording medium, and then the composite image recorded on the intermediate silver salt photographic recording medium is recorded on the second silver salt photographic recording medium. These operations are repeated until the subject image portion of the print obtained from the first silver salt photographic recording medium and the subject image portion of the print obtained from the second silver salt photographic recording medium have substantially the same quality, and when the density and color balance of the photographic processing control image portion of the print obtained from the first silver salt photographic recording medium become proper.

Then, by using the intermediate silver salt photographic recording medium when the subject image portions have substantially the same quality and when the density and color balance of the photographic processing control image portion become proper, the photographic processing control tool is prepared.

In accordance with the third aspect of the present invention, the pictorial digital image data digitized by computer graphics is stored in the digital storing medium (step (a) of the third aspect) without effecting each photographing steps (a) and (b) of the second aspect of the present invention.

As described above, in the third aspect of the present invention, no photographing processing is effected and no determination is made about whether the quality of two prints prepared (in step (e) of the second aspect) are substantially the same on the basis of a comparison of these prints. The image data of the subject image portion of the composite image and the image data of the photographic processing control image portion of the composite image are independently adjusted, then the composite image with the adjusted image data on the intermediate silver salt photographic recording medium is recorded, and then the composite image recorded on the intermediate silver salt photographic recording medium is recorded on the second silver salt photographic recording medium which is different from the intermediate silver salt photographic recording medium. These operations are repeated until the subject image portion of the print obtained from the second silver salt photographic recording medium has proper quality and until the density and color balance of the photographic processing control image portion of the print obtained from the second silver salt photographic recording medium become proper (step (e) of the second aspect of the present invention).

A color negative film or a color reversal film is used for photographing in a general still camera for silver salt photography. Further, in the automatic printer or printer processor, an image is printed onto a color paper by using a color negative film or a color reversal film, on which the image is recorded. Accordingly, color negative films can be used as the first silver salt photographic recording medium and the second silver salt photographic recording medium, and the color reversal film can be used as the intermediate silver salt photographic recording medium. In this case, the photographic processing control tool can be prepared by photographing the composite image of the intermediate silver salt photographic recording medium and recording the composite image on the color negative film.

DESCRIPTION OF THE PREFERRED EMBODIMENTS

Figure 1:
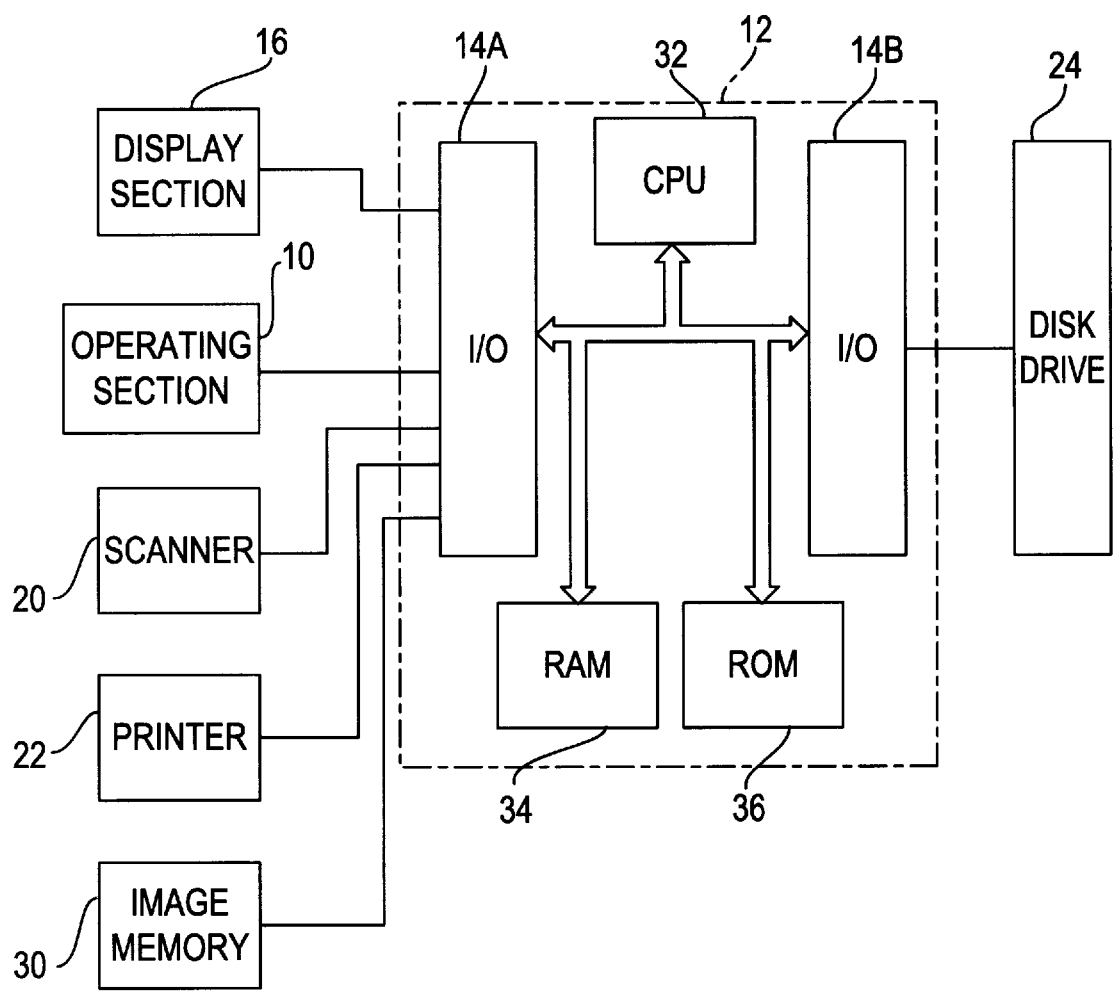
FIG. 1 is a block diagram of a data processing apparatus used in embodiments of the present invention.

Referring now to the attached drawings, a description will be given in detail of an embodiment to which the present invention is applied when a photographic processing control tool is prepared for an automatic printer (or a printer processor) which prints an image recorded on a color negative film onto a photographic printing paper by measuring the density of the image and automatically controlling an amount of exposure. FIG. 1 illustrates a data processing apparatus used for preparing a photographic processing control tool of the present invention.

The data processing apparatus includes a personal computer 12. The personal computer 12 is formed by a central processing unit (CPU) 32, RAM 34 for temporarily storing data or the like, ROM 36 in which a program for computer graphics, or the like is stored, input/output devices 14A, 14B, and buses for connecting the above-described devices.

Connected to the input/output device 14A are an operating section 10 including a keyboard or a mouse, a display section 16 formed by a CRT, a scanner 20 for reading an image and converting it into digital data, a color digital printer 22 formed by a color laser printer, a flying-spot film recorder, or the like, and an image memory 30 serving as a digital recording medium, which is formed by a hard disk, a magnetic tape or the like. Further, connected to the input/output device 14B is a disk drive 24 for storing data in a memory disk which is a digital recording medium and for reading out the stored data. Meanwhile, when a digital still camera is used as image recording means, the scanner 20 is not necessary.

In order to prepare the photographic processing control tool of the present invention, in addition to the above-described data processing apparatus, there are used a still camera for silver salt photography in which a color reversal film or a color negative film is loaded, a film processor for effecting development processing for a color reversal film or a color negative film, a printer for printing a film image onto a color paper (the photographic processing control tool of the present invention is used in a printer of the same kind as this printer), a paper processor for effecting development processing of a color paper, and an exposure device in which an image recorded on a film is photographed and is exposed onto another film. Note that a printer processor can be used in place of the printer and the paper processor, and Champion and Rocky (both are manufactured by Fuji Photo Film Co., Ltd., trade names) are known as printer processors. Further, in a third embodiment of the present invention which will be described later, a still camera for silver salt photography and a digital still camera or the like are not necessary.

[First Embodiment]

A first embodiment of a method for preparing a photographic processing control tool will be hereinafter described with reference to FIGS. 2 through 4. In the first embodiment, as a silver salt photographic recording medium, a color reversal film for recording a positive image, a color negative film for recording a negative image, and a color paper for recording a negative image recorded on a color negative film as a positive image are used.

Figure 2:
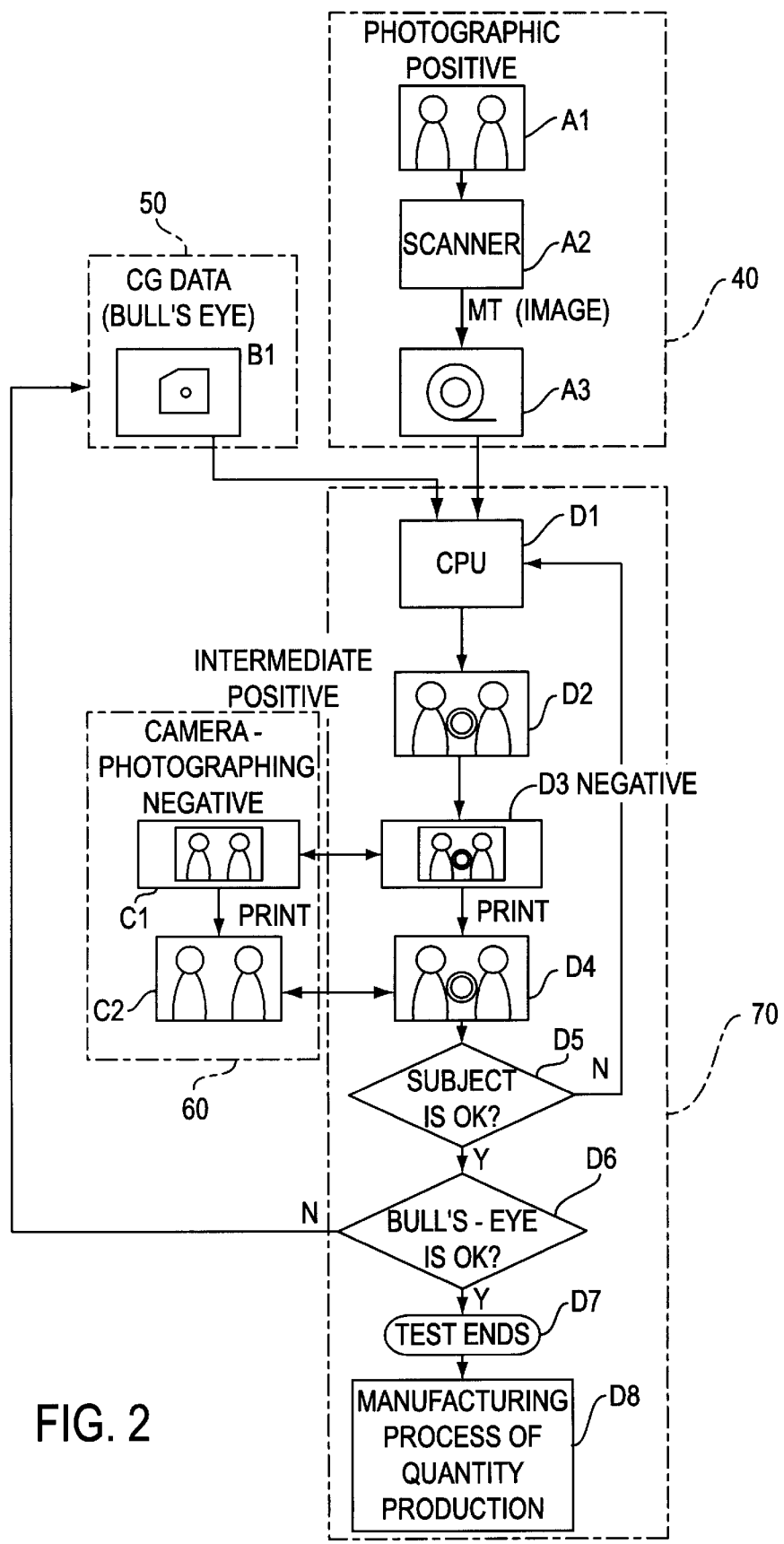
FIG. 2 is a flow chart showing a procedure for preparation of a photographic processing control tool according to a first embodiment of the present invention.
Figure 3:
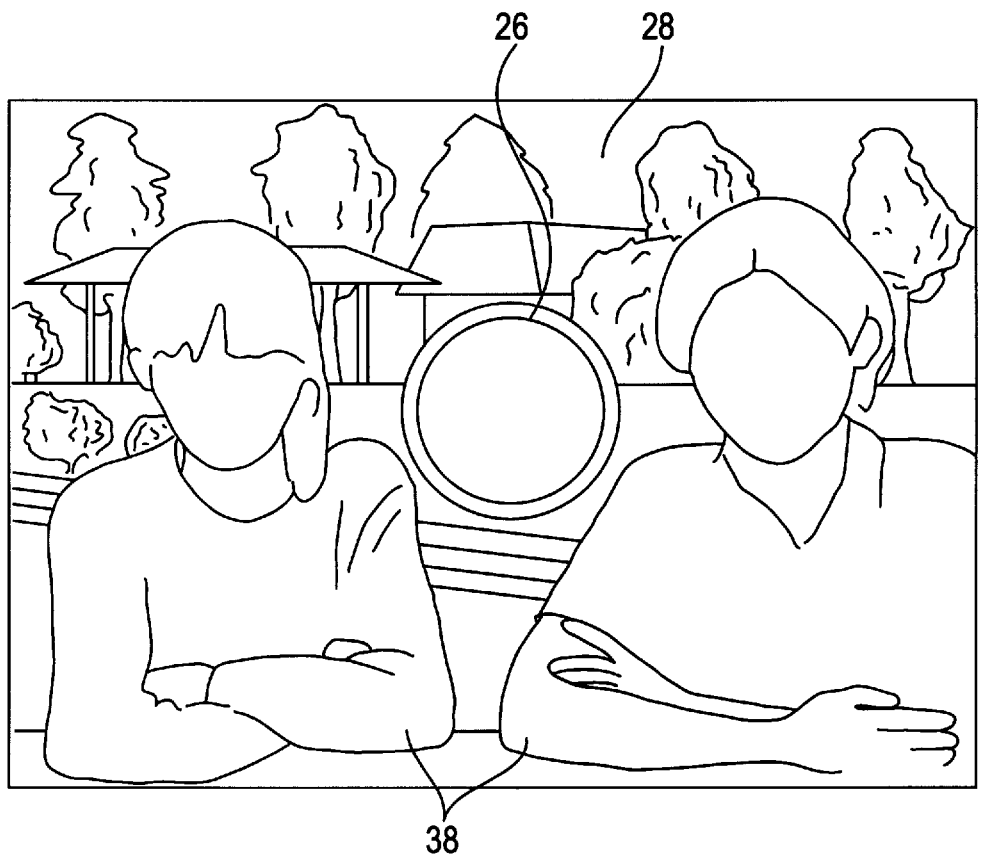
FIG. 3 is a schematic diagram showing an intermediate positive image of the embodiment of the present invention.

As shown in FIG. 2, the present embodiment is formed by steps 40, 50, 60 and 70. In step 40, digital image data which represents an image of a human figure which is a preselected subject, i.e., a standard subject, is stored on a digital storing medium. In step 50, data of a photographic processing control image digitized by computer graphics is stored on a digital storing medium. In step 60, the same subject as aforementioned is photographed at the same time and an image of the subject is recorded on a color negative film and is printed. In step 70, image data of a composite image is corrected and the photographic processing control tool is prepared.

In procedure A1 of step 40, a subject, i.e., a human figure, is photographed, by using a still camera for silver salt photography in which a color reversal film is loaded, so that a region corresponding to the face thereof is particularly exposed correctly. At this time, photographing processing in procedure C1 of step 60 which will be described later is performed. The color reversal film on which the subject has been photographed undergoes development processing by a film processor and a pictorial positive image is recorded on the color reversal film.

In the next procedure A2, the pictorial positive image recorded on the color reversal film is read by the scanner 20 in such a manner as to be subjected to color separation processing of R(red), G(green) and B(blue), and is thereby converted into digitized pictorial image data. Meanwhile, at this time, each data of R, G and B is, for example, divided into 256 gradations from the minimum density to the maximum density and is represented with data of eight bits for each gradation. Accordingly, $256^3$ gradations of color can be reproduced.

In procedure A3, the digital image data is stored in the image memory 30, a memory disk loaded in the disk drive 24, or a digital recording medium such as a magnetic tape or the like.

In procedure B1 of step 50, by using a program for computer graphics which is recorded in the above-described data processing apparatus and which can reproduce the same kind of color as that of the above-described digital data, digital image data in which an interior of a circular portion is represented with standard gray, i.e., photographic processing control image (Bull's-eye) data is prepared, and is stored in an area which is different from the above-described pictorial image in the image memory 30 or in the memory disk loaded in the disk drive 24.

In procedure C1 of step 60, the same subject as that in procedure A1 is concurrently photographed under the same correct exposure condition as that of procedure A1 by using the still camera for silver salt photography in which a color negative film is loaded, and the exposed color negative film is subjected to development processing by the film processor, and a pictorial negative image is accordingly recorded on the color negative film.

In the next procedure C2, by using the automatic printer and the paper processor in which the photographic processing control tool prepared according to the present embodiment is used or using a printer processor, the negative image recorded on the color negative film is printed onto a color paper and the color paper is sequentially subjected to development processing, fixing processing, washing processing and drying processing, and a print with a positive image recorded thereon is accordingly prepared.

Meanwhile, the photographic processing in the above-described steps 40, 60 can be performed either indoors, for example, in a photographic studio or the like, or outdoors. If the subject is photographed outdoors at the same time in steps 40, 60, simple and easy photographic processing can be effected as compared with a case in which photographing processing is effected while illumination is being controlled in the photographic studio.

In procedure D1 of step 70, the digital image data stored in the image memory or in the memory disk and the photographic processing control image data are composed to prepare a composite image of the subject image and the photographic processing control image by using the data processing apparatus so that the photographic processing control image is located at a predetermined position of the screen (for example, at the center thereof). The prepared composite image is displayed on the display section 16. An operator adjusts the position of the photographic processing control image if necessary.

In the next procedure D2, by using the color digital printer 22, the composite image is exposed onto the color reversal film and is subjected to development processing by the film processor, and an intermediate positive image is thereby prepared. FIG. 3 shows an example of the intermediate positive image. In this figure, numeral 26 denotes a photographic processing control image, numeral 28 denotes a background, and numeral 38 denotes main subjects.

In procedure D3, by using an exposure device which will be described later, the intermediate positive image recorded on the color reversal film is photographed on the color film and is sequentially subjected to development processing, fixing processing, washing processing and drying processing, and the color negative film on which the negative image has been recorded is prepared.

In procedure D4, by using the printer processor used in procedure C2 of step 60, or using the automatic printer and the paper processor, the negative image recorded on the color negative film is printed onto the color paper and is sequentially subjected to development processing, fixing processing, washing processing and drying processing, and a print on which the intermediate positive image has been recorded is prepared.

In procedure D5, respective finished states of a main subject portion of the print prepared in procedure C2 and a main subject portion of the print prepared in procedure D4 are compared by visual inspection of an operator or by measurement using a densitometer, and it is determined whether or not the respective finished states are of substantially the same quality. Since the human figure is photographed in the present embodiment, it suffices that determination is made about whether or not the finished states of the region corresponding to the face of the human figure on the prints prepared in procedures C2, D4 are of substantially the same quality. When the finished states on the prints prepared in procedures C2, D4 are not of substantially the same quality, the process returns to procedure D1, in which the image data of the main subject portion is corrected. Thereafter, as illustrated in procedures D2 through D5, preparation of the intermediate positive image, preparation of the negative image; preparation of prints, and comparison of prints are repeated until the finished states of the main subject portion, which are of substantially the same quality, are obtained.

When the finished states which are of substantially the same quality, in procedure D6, the density of the interior of the circular portion which is the photographic processing control image becomes standard gray which is a target density and it is determined whether or not color balance is correct or not.

When the density of the interior of the circular portion is not standard gray, or when color balance is not correct, the process returns to procedure B1, in which data is corrected by using a program for computer graphics so as to adjust the density of the interior of the circular portion, color balance, or both the density and the color balance. Then, as illustrated in procedures D2 through D5, preparation of the intermediate positive image, preparation of the negative image, preparation of prints, and comparison of prints are effected again. The automatic printer or the printer processor has the function of photometrically measuring the negative image and automatically controlling an amount of exposure, and when different subjects are photographed, the respective amounts of exposure accordingly vary. Thus, when the density and color balance of the interior of the circular portion are adjusted in procedure B1, the amount of exposure varies in accordance with this adjustment and the finished state of the main subject portion of the print changes. For this reason, when the finished states are not of substantially the same quality, the process returns again to procedure D1, in which the image data of the main subject portion is corrected, and as illustrated in procedures D2 through D5, preparation of the intermediate positive image, preparation of the negative image, preparation of prints, and comparison of prints are repeated until the finished states of the main subject portion, which are of substantially the same quality, are obtained. When the finished states which are of substantially the same quality are obtained, the density of the interior of the circular portion which is the photographic processing control image is standard gray in procedure D6 and determination is made again about whether or not color balance is correct.

When the finished states which are of substantially the same quality, the density of the interior of the circular portion is standard gray and the color balance becomes proper, the process ends. When the finished states are not of substantially the same quality, or when the density of the interior of the circular portion is not standard gray or when the color balance is not correct, the above-described procedures D1 through D6, and B1 are repeated.

When the finished states are of substantially the same quality, the density of the interior of the circular portion is standard gray, and the color balance is correct, correction of the intermediate positive image is completed (procedure D7).

Figure 4:
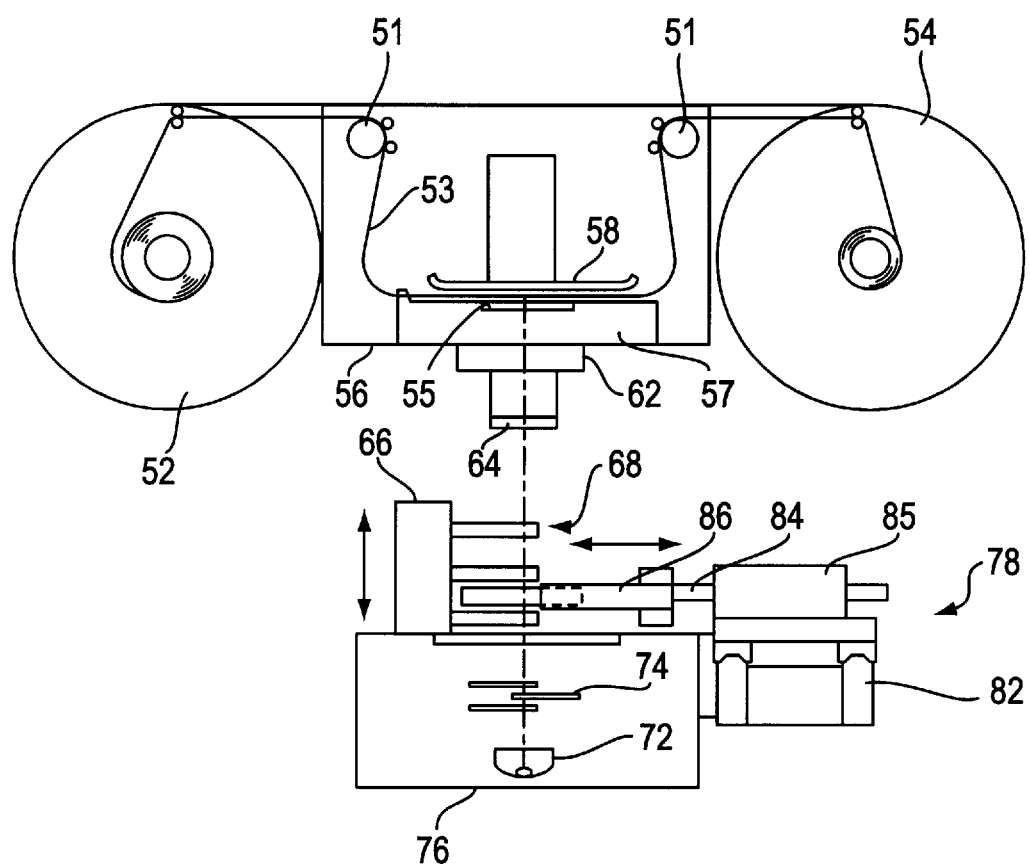
FIG. 4 is a schematic diagram of an exposure device.
Figure 5:
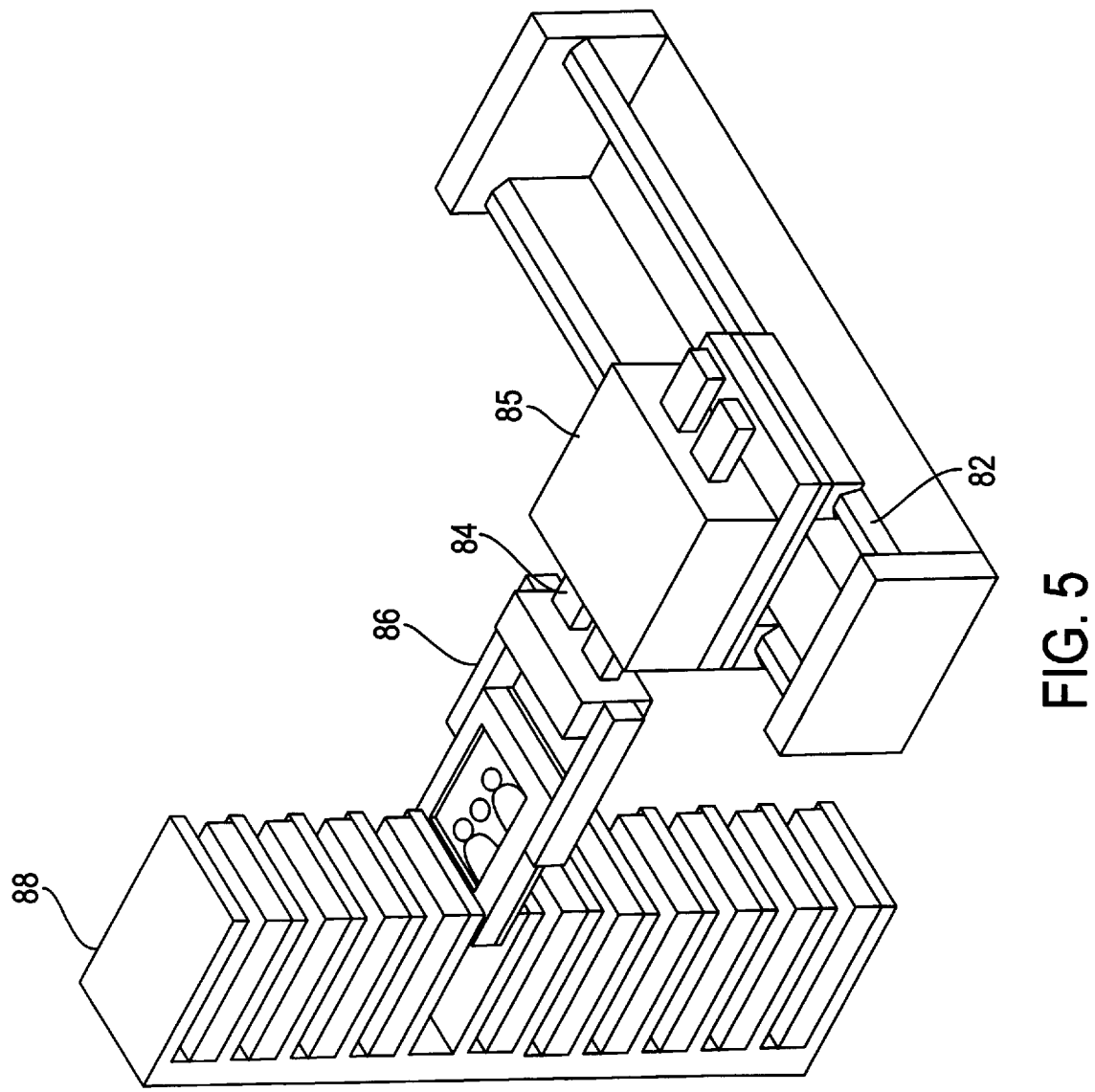
FIG. 5 is a schematic diagram of a robot section of the exposure device.

Subsequently, in procedure D8, a large number of negative films of the photographic processing control tool on which a latent image has been formed by using the exposure device shown in FIGS. 4 and 5 is prepared from the adjusted intermediate positive image. Meanwhile, the intermediate positive image is formed as one set in which plural kinds of images having various density balance in procedures B1 and D1 and the different subjects are prepared.

The exposure device used in the above-described procedures D3, D8 includes a film supply section 52 and a film winding section 54 as shown in FIGS. 4 and 5. A color negative film 53 is entrained between the film supply section 52 and the film winding section 54 and conveying rollers 51 for conveying the color negative film are disposed therebetween.

A camera section 56 is disposed between the film supply section 52 and the film winding section 54. The camera section 56 is provided with a film mounting table 57 with an opening 55 formed therein, and a pressure plate 58 provided to nip the film between the film mounting table 57 and the pressure plate 58. A shutter 62 and a lens 64 are mounted to the film mounting table 57.

A document loading section 68 on which a document is loaded and which has an exposure stage 66 which can move vertically is disposed below the camera section 56. A light source section 76 formed by a lamp 72, a CC filter (i.e., color correction filter) 74 and a mirror box (not shown) is disposed below the document loading section 68.

A robot section 78 is mounted at a side surface of the light source section 76. The robot section 78 is formed from horizontal rails 82 mounted at the side surface of the light source section 76 so as to be vertically movable, a moving stand 85 which can move along the horizontal rails 82, and an arm 84 mounted to the moving stand 85 in an extensible-retractable manner in a direction perpendicular to the horizontal rails 82. An opening/closing chuck 86 for holding the document is provided at an end of the arm 84.

In the case in which the tool is prepared by the exposure device, when a switch is turned on in a state in which one set of documents with the intermediate positive film held is loaded in a magazine 88, the arm of the robot section moves and the document is held and conveyed by the chuck, and the document is loaded on the exposure stage. In this state, when the shutter is closed after having been opened for a predetermined time, the image on the document is photographed on the color negative film. Meanwhile, at the time of photographing, color correction or diaphragm control is not effected. After photographing of one set of documents has been completed, a notch indicating a break of the tool is formed in the film and the process returns to a photographing state of the next set of documents. It should be noted that, when the exposure device is used in procedure D3, it suffices that one sheet of document be used.

[Second Embodiment]

Figure 6:
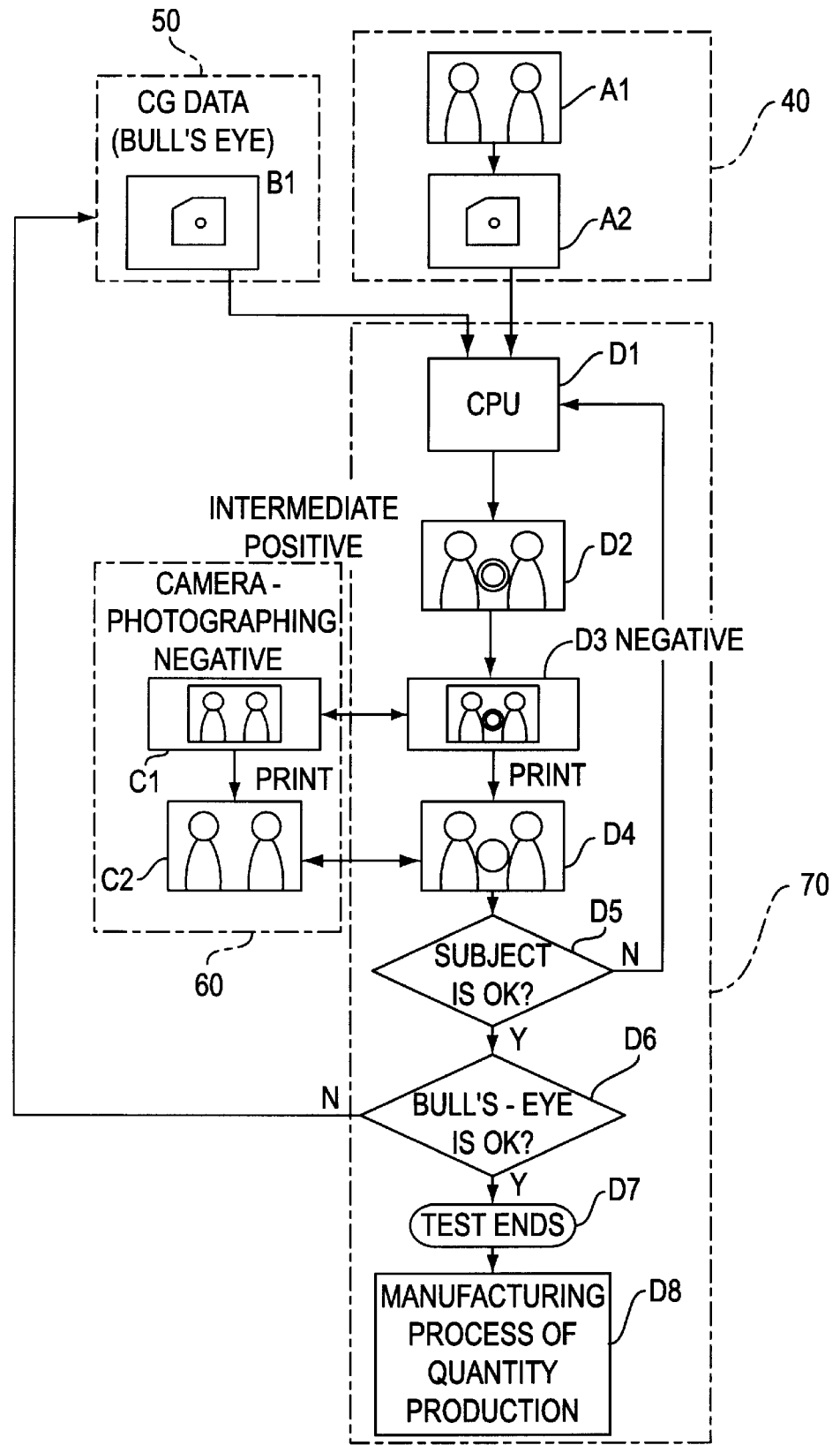
FIG. 6 is a flow chart showing a procedure for preparation of a photographic processing control tool according to a second embodiment of the present invention.

Next, a second embodiment of the present invention will be described with reference to FIG. 6. In the second embodiment, a digital still camera is used as the image recording means. It should be noted that, in FIG. 6, portions corresponding to those in FIG. 2 will be denoted by the same reference numerals, and a description thereof will be omitted.

In procedure A1 of step 40, a subject, i.e., a human figure, is photographed by using a digital still camera so that a region corresponding to the face is particularly exposed correctly. In procedure A2, the pictorial digital image data is recorded on a memory disk which is a digital recording medium. At this time, photographing in procedure C1 of step 60 which will be described later is effected at the same time. The memory disk on which the digital image data has been recorded is loaded in the disk drive 24.

Meanwhile, as the digital still camera, the Digital-Card-Camera DS-505 (manufactured by Fuji Photo Film Co., Ltd., a trade name) or the like can be used. Further, since three colors of R(red), G(green) and B(blue) are each photographed by the digital still camera in such a manner as to be subjected to color separation of 256 gradations from the minimum density to the maximum density, each data of R, G and B is represented with data of eight bits for each gradation and $256^3$ gradations of color can be reproduced.

[Third Embodiment]

Figure 7:
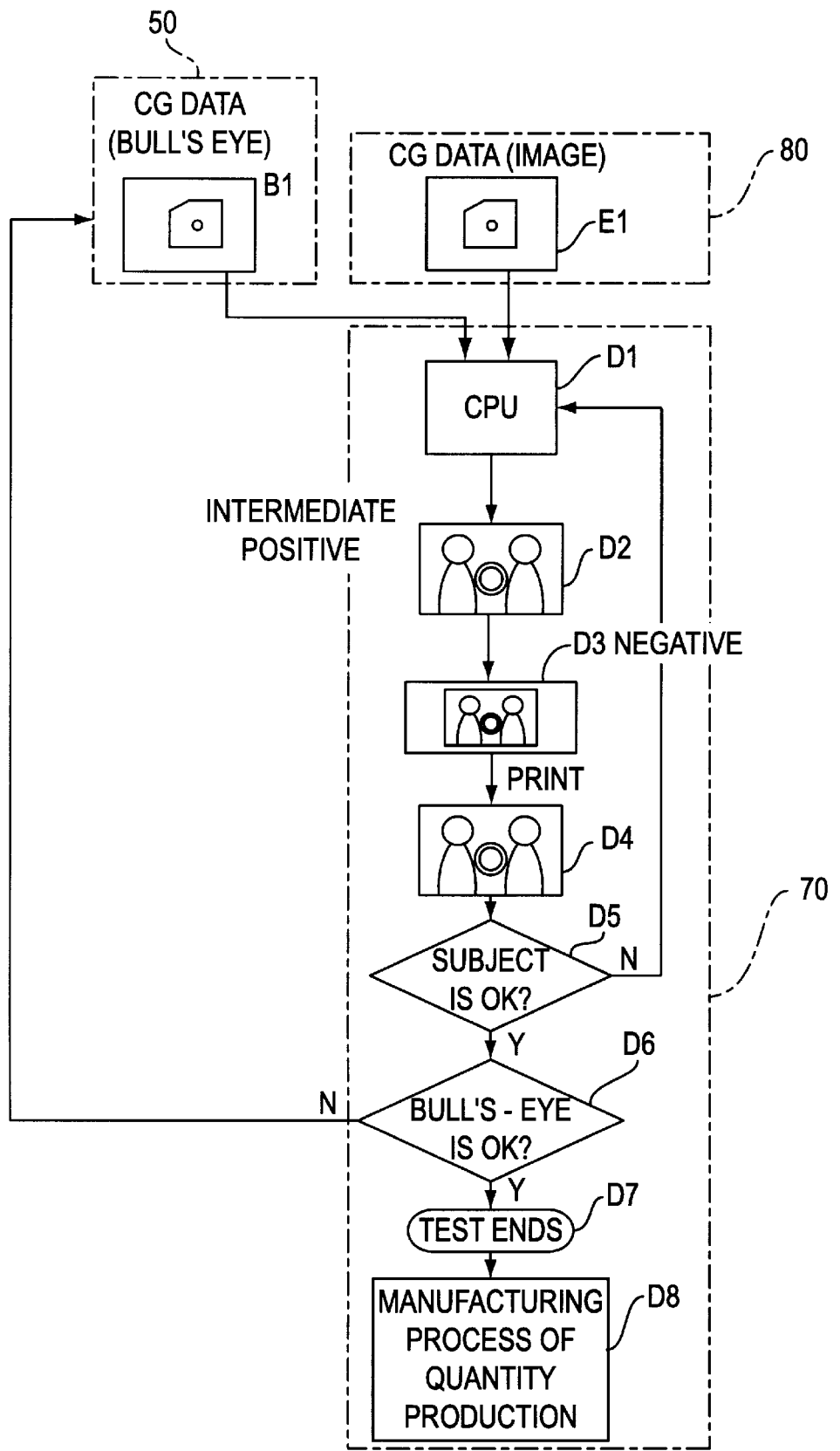
FIG. 7 is a flow chart showing a procedure for preparation of a photographic processing control tool according to a third embodiment of the present invention.

Next, a third embodiment of the present invention will be described with reference to FIG. 7. The third embodiment is constructed in that a pictorial digital image data is stored in a digital storing medium without a subject being photographed by a still camera for silver salt photography or a digital still camera. It should be noted that, in FIG. 7, portions corresponding to those in FIG. 2 will be denoted by the same reference numerals, and a description thereof will be omitted.

In procedure E1 of step 80 according to the third embodiment, digital image data of a preselected subject (i.e., a human figure) is prepared by computer graphics which allows reproduction of the same kind of color as that of the above-described digital image data, and is stored in the digital storing medium such as a memory disk.

In this embodiment, since the subject is controlled so as not to be photographed, procedure A1 of step 40 and procedures C1, C2 of step 60 of the first embodiment are not necessary. In procedure D6 of this embodiment, it is determined whether or not a main subject image portion of a print obtained from the intermediate film is of a correct quality, and it is determined whether or not the density of the interior of the circular portion of the composite image of the print is standard gray and the color balance is correct. Further, correction of data, preparation of the intermediate positive image, preparation of the intermediate negative image, preparation of prints, determination about standard gray and color balance are repeated until the main subject image portion becomes one of correct quality, the interior of the circular portion becomes standard gray, and color balance becomes correct.

In the foregoing, the circular image is used as the photographic processing control image. However, the present invention is not limited to the same, and a color patch may be used as the photographic processing control image.

Further, the case was described in which the density and color balance of the photographic processing control image is adjusted after adjustment of print quality. However, the present invention is not limited to the same, and the print quality may be adjusted after the density and color balance of the photographic processing control image have been adjusted.

In addition, in the above-described embodiments, the example was given in which the present invention is applied to the case in which the photographic processing control tool for the automatic printer for printing, onto the color paper, the image recorded on the color negative film is prepared. However, the present invention can also be applied to a case in which a photographic processing control tool for other types of automatic printers or printer processors in accordance with the same principle as the aforementioned.

What is claimed is:

1. A method for preparing a photographic processing control tool, comprising the steps of:

(a) photographing a preselected subject and recording a first image of said preselected subject on a first silver salt photographic recording medium;

(b) photographing said preselected subject substantially synchronously with the photographing of said step (a) and recording a second image of said preselected subject on a second silver salt photographic recording medium;

(c) converting said first image into first digital image data and storing said first digital image data in a digital storing medium;

(d) storing, in said digital storing medium, digital control image data of a photographic processing control image digitized by computer graphics;

(e) preparing a composite image of said first image and said digital control image data;

(f) storing said composite image on a third silver salt photographic recording medium;

(g) determining whether a portion of a print of said preselected subject obtained from said second silver salt photographic recording medium and a portion of said preselected subject of a print of said composite image obtained from said third silver salt photographic recording medium have substantially the same quality, and whether the density and color balance of an image portion of said digital control image of said composite image obtained from said third silver salt photographic recording medium reach a predetermined level;

(h) repeating the operations of: independently correcting image data of said portion of said preselected subject of said composite image and said image portion of said digital control image in said composite image, recording said composite image having corrected image data in an intermediate silver salt photographic recording medium, and recording, on said third silver salt photographic recording medium, said composite image recorded on said intermediate silver salt photographic recording medium; and (i) preparing a photographic processing control tool by using said intermediate silver salt photographic recording medium when said portion of said preselected subject of said print obtained from said second silver salt photographic recording medium and said portion of said preselected subject of said composite image obtained from said third silver salt photographic recording medium have substantially the same quality, and when the density and color balance of said image portion of said digital control image of said composite image reach said predetermined level.

2. A method for preparing a photographic processing control tool according to claim 1, wherein said second silver salt photographic recording medium and said third silver salt photographic recording medium are color negative films, and wherein said first silver salt photographic recording medium and said intermediate silver salt photographic recording medium are color reversal films, said photographic processing control tool being prepared by photographing said intermediate silver salt photographic recording medium and recording said composite image on a color negative film.

3. A method for preparing a photographic processing control tool according to claim 2, wherein said step (c) includes reading said first silver salt photographic recording medium with a scanner and converting said first image into said digital image data.

4. A method for preparing a photographic processing control tool according to claim 1, wherein said step (c) includes reading said first silver salt photographic recording medium with a scanner and converting said first image into said digital image data.

5. A method for preparing a photographic processing control tool, comprising the steps of:

(a) photographing a preselected subject by a still camera for silver salt photography and recording an image of said preselected subject on a first silver salt photographic recording medium;

(b) photographing said preselected subject substantially synchronously with the photographing of said step (a) with a digital still camera and storing digital image data of said preselected subject in a digital storing medium;

(c) storing, in the digital storing medium, control image data of a photographic processing control image digitized by computer graphics;

(d) preparing a composite image of said digital image data and said control image data;

(e) storing said composite image on an intermediate silver salt photographic recording medium and recording, on a second silver salt photographic recording medium, said composite image stored on said intermediate silver salt photographic recording medium;

(f) determining whether a portion of said preselected subject of a print obtained from said first silver salt photographic recording medium and a portion of said preselected subject of said composite image of a print obtained from said second silver salt photographic recording medium have substantially the same quality, and whether the density and color balance of said control image data of said composite image reach a predetermined level;

(g) repeating the operations of: independently correcting image data of said composite image, recording said composite image having corrected image data in said intermediate silver salt photographic recording medium, and recording, on the second silver salt photographic recording medium said composite image having corrected image data recorded on said intermediate silver salt photographic recording medium; and (h) preparing a photographic processing control tool by using said intermediate silver salt photographic recording medium when said portion of said preselected subject of said print obtained from said first silver salt photographic recording medium and said portion of said preselected subject of said composite image of said print of said second silver salt photographic recording medium have substantially the same quality, and the density and color balance of said control image data of said composite image of said print obtained from the second silver salt photographic recording medium reach said predetermined level.

6. A method for preparing a photographic processing control tool according to claim 5, wherein said first silver salt photographic recording medium and said second silver salt photographic recording medium are color negative films, and wherein said intermediate silver salt photographic recording medium is a color reversal film, said photographic processing control tool being prepared by photographing said composite image of said intermediate silver salt photographic recording medium and recording said composite image on a color negative film.

7. A method for preparing a photographic processing control tool, comprising the steps of:

(a) storing, in a digital storing medium, pictorial digital image data digitized by computer graphics;

(b) storing, in a digital storing medium, control image data of a photographic processing control image digitized by computer graphics;

(c) preparing a composite image of said pictorial digital image and said control image data;

(d) storing said composite image on an intermediate silver salt photographic recording medium;

(e) recording, on a first silver salt photographic recording medium, said composite image from said intermediate silver salt photogaphic recording medium;

(f) determining whether a portion of said pictorial digital image of a print obtained from said composite image on the first silver salt photographic recording medium has proper quality, and whether the density and color balance of a portion of said control image data of said composite image obtained from said first silver salt photographic recording medium reach a predetermined level;

(g) repeating the operations of: independently adjusting image data of said pictorial digital image of said composite image and image data of said control image data of said composite image, recording said composite image having adjusted image data in said intermediate silver salt photographic recording medium, and recording, on said first silver salt photographic recording medium, which is different from said intermediate silver salt photographic recording medium, said composite image recorded on said intermediate silver salt photographic recording medium; and (h) preparing a photographic processing control tool by using said intermediate silver salt photographic recording medium when said portion of said pictorial digital image of said print obtained from said composite image on said first silver salt photographic recording medium reach a predetermined quality and said portion of said composite image have substantially the same quality, and when the density and color balance of said portion of said control image data of said composite image obtained from the first silver salt photographic recording medium reach a predetermined level.

8. A method for preparing a photographic processing control tool according to claim 7, wherein said first silver salt photographic recording medium is a color negative film, and said intermediate silver salt photographic recording medium is a color reversal film, said photographic processing control tool being prepared by photographing said composite image of said intermediate silver salt photographic recording medium and recording said composite image on a color negative film.

9. A method for preparing a photographic processing control tool, comprising the steps of:

(a) photographing a preselected subject and recording a first image of said preselected subject on a first silver salt photographic recording medium;

(b) converting said first image into first digital image data and storing said first digital image data on a digital storing medium;

(c) storing, on said digital storing medium, digital control image data of a photographic processing control image;

(d) preparing a composite image of said first image and said digital control image data;

(e) storing said composite image on an intermediate silver salt photographic recording medium;

(f) recording, on a second silver salt photographic recording medium, said composite image from said intermediate silver salt photographic recording medium;

(g) determining whether a portion of a print of said preselected subject obtained from said composite image on said second silver salt photographic recording medium has a predetermined quality level, and whether the density and color balance of a portion of said print of said control image data obtained from said composite image reach a predetermined level;

(h) repeating the operations of: independently adjusting image data of said preselected subject of said composite image and image data of said control image data of said composite image, recording said composite image having adjusted image data on said intermediate silver salt photographic recording medium, and recording, on said second silver salt photographic recording medium which is different type of recording medium than said intermediate silver salt photographic recording medium, said composite image recorded on said intermediate silver salt photographic recording medium; and (i) preparing a photographic processing control tool by using said intermediate silver salt photographic recording medium when said portion of said preselected subject of said print obtained from said composite image on the second silver salt photographic recording medium has proper quality, and when the density and color balance of said portion of said control image data of said composite image obtained from the second silver salt photographic recording medium reach a predetermined level.

10. A method for preparing a photographic processing control tool, comprising the steps of:

(a) photographing a preselected subject by a digital still camera and storing digital image data of said preselected subject in a digital storing medium;

(b) storing, in said digital storing medium, digital control image data of a photographic processing control image digitized by computer graphics;

(c) preparing a composite image of said digital image data of said preselected subject and said digital control image data;

(d) storing said composite image on an intermediate silver salt photographic recording medium;

(e) recording, on a first silver salt photographic recording medium, said composite image from said intermediate silver salt photographic recording medium;

(f) determining whether a portion of a print of said preselected subject obtained from said composite image on said first silver salt photographic recording medium has proper quality, and whether the density and color balance of a portion of said print of said control image data obtained from said composite image reach a predetermined level;

(g) repeating the operations of: independently adjusting image data of said preselected subject of said composite image and image data of said control image data of said composite image, recording said composite image having adjusted image data on said intermediate silver salt photographic recording medium, and recording, on said first silver salt photographic recording medium, which is different type of recording medium than said intermediate silver salt photographic recording medium, said composite image recorded on said intermediate silver salt photographic recording medium; and (h) preparing a photographic processing control tool by using said intermediate silver salt photographic recording medium when said portion of said preselected subject of said print obtained from said composite image on the first silver salt photographic recording medium has proper quality, and when the density and color balance of said portion of said control image data of said composite image obtained from the first silver salt photographic recording medium reach a predetermined level.

11. An apparatus for producing a photographic processing control tool from a plurality of intermediate positives, the density and color balance of each positive being different from one another, said apparatus comprising:

a still camera for photographing a subject onto a first silver salt photographic recording medium and onto a second silver salt photographic recording medium;

a scanner for scanning an image of said subject from said first silver salt photographic recording medium and converting said image into a digital image;

a controller for combining said digital image with a digital control image for photographic processing control to form a composite image;

means for recording said composite digital image onto an intermediate silver salt photographic recording medium to produce an intermediate positive;

means for recording said composite image on said intermediate positive onto a third silver salt photographic recording medium;

means for determining whether an image of said subject recorded on said second silver salt photographic recording medium and said composite image of said subject recorded on said third silver salt photographic recording medium have substantially the same quality, and whether the density and color balance of said composite image of said subject obtained from the third silver salt photographic recording medium reach a predetermined level;

means for correcting said digital image and said composite image according to a comparison result determined by comparing said image recorded on said second silver salt photographic recording medium and said composite image; and means for producing a photographic processing control tool from said composite image when said image of said subject on the second silver salt photographic recording medium and said composite image of said subject recorded on said third silver salt photographic recording medium have substantially the same quality, and when the density and color balance of said composite image of said subject obtained from the third silver salt photographic recording medium reaches said predetermined level.

12. An apparatus for producing a photographic processing control tool from a plurality of intermediate positives, the density and color balance of each positive being different from one another, said apparatus comprising:

a digital image storing device for storing pictorial digital image data of a subject on a digital storing medium;

a controller for combining said digital image data with a digital control image for photographic processing control to produce a composite image;

means for recording said composite image onto an intermediate silver salt photographic recording medium to produce an intermediate positive;

means for recording said composite image on said intermediate positive onto a first silver salt photographic recording medium;

means for determining whether said composite image on said first silver salt photographic recording medium has a predetermined quality level, and whether the density and color balance of said composite image obtained from said first silver salt photographic recording medium reach a predetermined level;

means for correcting said digital image and said composite image according to an output of said determination means; and means for producing a photographic processing control tool from said composite image recorded on said intermediate silver salt photographic recording medium when said composite image recorded on said first silver salt photographic recording medium has reached said predetermined quality level, and the density and color balance of said composite image obtained from said first silver salt photographic recording medium reach said predetermined level.

* * * * *